Sept. 18, 1956 R. R. WEBSTER 2,763,784
METHOD AND APPARATUS FOR CONTINUOUSLY MEASURING
TIN THICKNESS OF TINNED STRIP
Filed Oct. 19, 1951 4 Sheets-Sheet 2

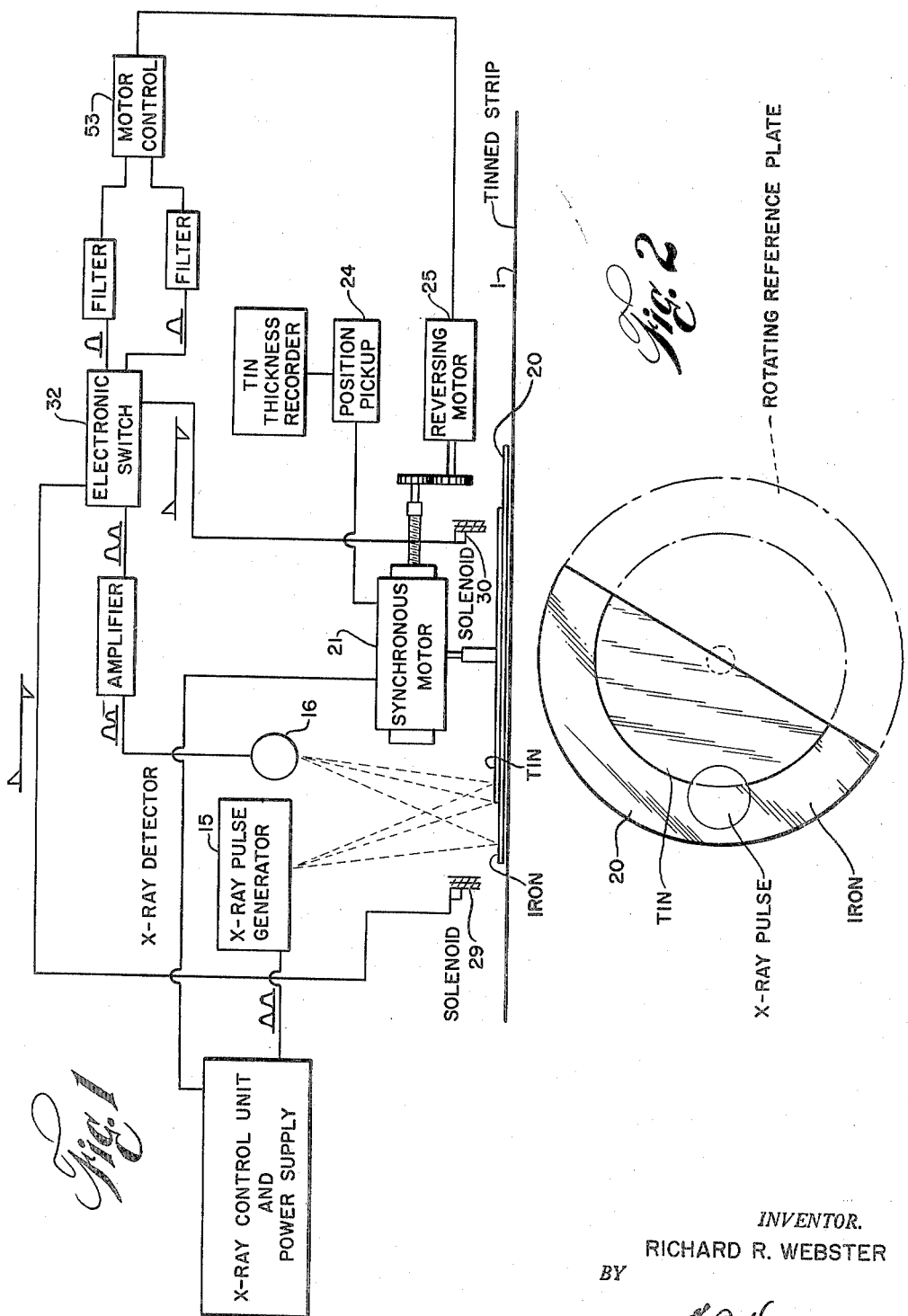

INVENTOR.
RICHARD R. WEBSTER
BY
ATTORNEY

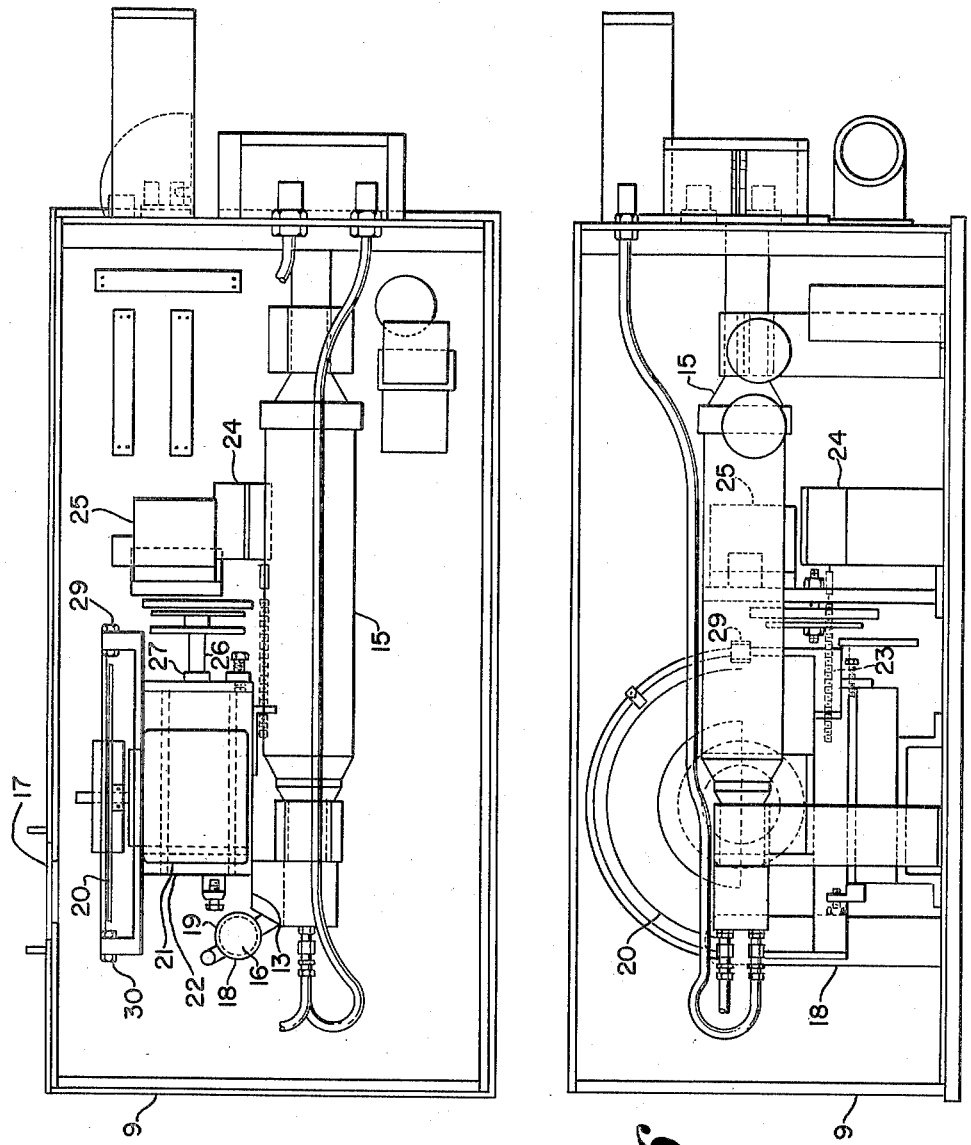

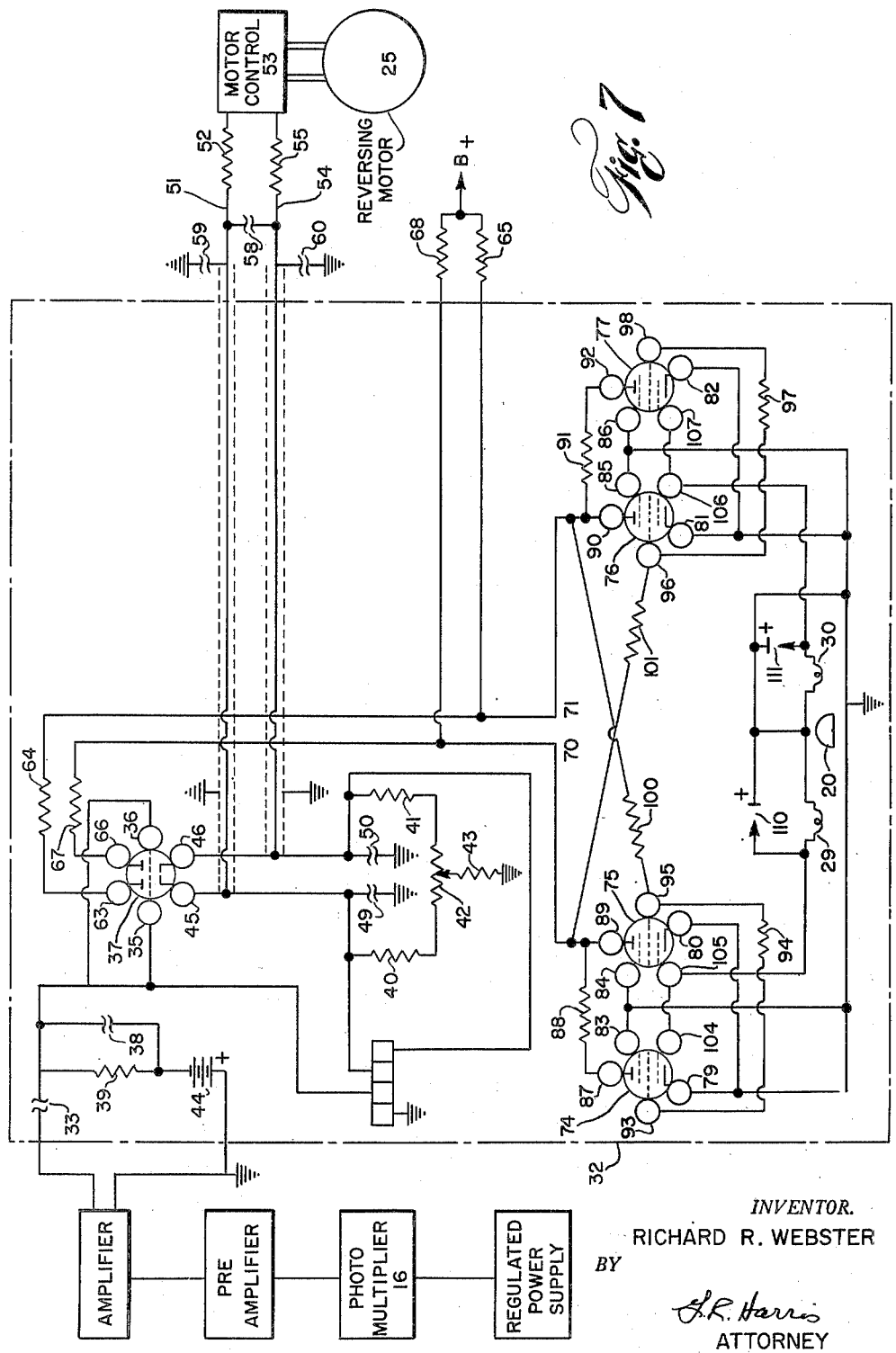

United States Patent Office 2,763,784
Patented Sept. 18, 1956

2,763,784

METHOD AND APPARATUS FOR CONTINUOUSLY MEASURING TIN THICKNESS OF TINNED STRIP

Richard R. Webster, Beaver, Pa., assignor to Jones & Laughlin Steel Corporation, Pittsburgh, Pa., a corporation of Pennsylvania Application October 19, 1951, Serial No. 252,016

14 Claims. (Cl. 250—51)

This invention relates to an improved process for continuously measuring the thickness of tin on tinned ferrous strip and apparatus appropriate for such measurement. It is more particularly concerned with a method and apparatus utilizing X-rays and measuring tin thickness by comparison of X-ray fluorescence from the specimen with that from a standard or reference sample having a tin coating of known thickness.

United States Patent 2,521,772, issued September 12, 1950, to Hugh F. Beeghly, discloses a method of measuring the thickness of a tin coating on a ferrous base by irradiating the specimen with X-rays of wave lengths selected to excite fluorescence in the ferrous base metal which is absorbed in the tin coating. The absorption of this fluorescence in the coating was found by Beeghly to be a function of the thickness of the tin coating and therefore capable of use as a measurement of coating thickness. A preferred form of Beeghly's process made use of an X-ray tube having a copper target and operating at a potential of about 30,000 volts as the X-ray source and a Geiger counter as the detector of the fluorescence generated in the base metal and partially absorbed in passing through the coating metal. The method disclosed by Beeghly, although a great advance over previously known methods of measuring coating thickness, requires rather close control of X-ray tube voltage as well as Geiger counter operating conditions for precise results and, furthermore, requires an appreciable interval of time for each coating thickness measurement because of the limited counting rate of known Geiger counters. For these reasons, Beeghly's method is not well suited without modification for rapid coating thickness measurement and particularly for the continuous measurement of coating thickness of tin-coated strip.

The great bulk of tin plate today is made in the form of continuous electroplated strip which is wound up in coils after tinning and is only cut into individual sheets of tin plate as a final step. Since coating thickness measurements on individual sheets cannot be of immediate help in adjusting the operation of the electrotinning line, it would be highly desirable to be able to measure continuously the thickness of the tin coating on tinned strip as it comes from the electrotinning line. It is an object, therefore, of the present invention to provide a method and apparatus for continuously measuring such tin thickness. It is a further object of this invention to provide a method and apparatus suitable for such use on a production line and under production conditions. Since under these conditions power line voltage variations are generally rather considerable, atmospheric conditions with respect to heat and humidity are generally unfavorable to the operation of precision instruments, and vibration may often be excessive, a method and apparatus for coating thickness measurements, the precision of which depended on absolute instrument readings, would be very difficult to provide and expensive to maintain. It is therefore another object of this invention to provide a method and apparatus for obtaining comparative coating thickness measurements in such a way that the thickness of the tin coating on the strip being measured is compared with the known coating thickness of a standard sample measured under the same conditions. Other objects will appear in the course of the explanation of my invention.

The method of my invention makes use of an X-ray tube as a source of X-rays alternately irradiating the tinned strip to be measured and a standard sample of tin coating on a ferrous base. This alternation proceeds at a relatively rapid rate, such as 60 times a second. The fluorescence alternately generated in the specimen and in the standard sample is directed alternately on the same detecting means which convert X-ray fluorescence into an electric current proportional in strength to the intensity of the fluorescence. I then separate the component of electric current from the detector corresponding to fluorescence from the specimen from the component of electric current from the detector corresponding to fluorescence from the standard, and compare these currents. In this way random variations in the intensity of radiation from the X-ray tube and random variations in the detector output do not impair the precision of my coating thickness measurements, since they affect specimen and standard equally and so cancel. I prefer to operate my X-ray tube so that it delivers a pulsed beam of X-rays rather than a steady beam, and to operate my apparatus so that alternate pulses of the X-ray beam irradiate specimen and standard respectively. Such pulses produce, of course, pulses of fluorescence from the ferrous base metal of the specimen and the standard respectively and these pulses are detected alternately by the same X-ray detecting means as above mentioned. Since the specimen which I wish to measure is a continuously moving strip from the electrotinning line, I direct my X-ray beam at this strip and alternately interpose between the X-ray source and the specimen and remove therefrom my standard sample in the form of a plate parallel to the strip. In this manner the specimen and standard are alternately irradiated and the alternate pulses of fluorescence from each are directed upon the same X-ray detecting means which is fixed in position with respect to the X-ray tube. I may compare the electric current from the X-ray detector corresponding to the fluorescence from the specimen with that from the standard, but I prefer to balance such currents by providing a standard so constructed that it may be moved into or out of the X-ray beam in a plane parallel to the strip and of such composition that the fluorescence generated in it by the X-ray beam varies intensity in accordance with its relative position therein. Thus, by mechanically moving my standard I am able to balance the currents from the X-ray detector, and utilize the relative position of the standard as an index of coating thickness.

The apparatus of my invention preferably includes an X-ray pulse generator which may conveniently be an X-ray tube operated with alternating voltage on its target, an X-ray detector which will be discussed in detail hereinafter, suitable electrical apparatus for amplifying electric currents from the X-ray detector and separating them into the components corresponding to fluorescence from specimen and standard, which will also be discussed in detail hereinafter, and a standard specimen in the form of a semi-circular reference plate rotating about an axis perpendicular to the strip so that the semi-circular reference plate is alternately interposed between X-ray source and specimen and withdrawn. This reference plate is rotated in synchronism with the pulse rate of the X-ray pulse generator so that successive pulses of X-rays irradiate specimen and reference plate respectively. The reference plate composing my standard could be made of a ferrous base having a tin coating, tapering in thickness from circumference to center so that the intensity of the fluorescence generated in the ferrous base and partially absorbed in the tin coating would vary in accordance with the relative distance between reference plate axis and X-ray beam. However, I find it more convenient to make this reference plate in the form of a ferrous base of uniform thickness carrying a tin coating of uniform thickness which, though semi-circular in plan, does not extend to the edge of the ferrous base. This reference plate is then positioned in the X-ray beam so that a portion of the beam irradiates the ferrous base only and the remainder, the tin plated base. Movement of the reference plate axis toward or away from the X-ray beam varies the intensity of the fluorescence generated in the ferrous base in the same manner as though the ferrous base were covered with a tin coating of variable thickness.

A present preferred embodiment of my invention is illustrated in the attached figures to which reference is now made.

Figure 1 is a schematic diagram of the arrangement of my apparatus illustrating the method of operation of my invention.

Figure 2 is a schematic plan view of my rotating reference plate.

Figure 5 is a plan view of my X-ray source, rotating reference plate and X-ray detector.

Figure 6 is an elevation of the apparatus in Figure 5.

Figure 7 is an electrical schematic diagram of a portion of my apparatus.

Figure 4:
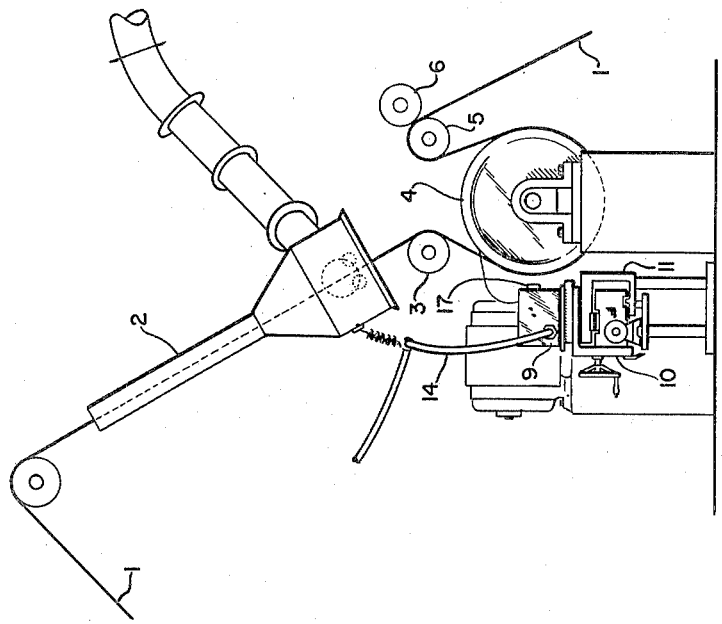
Figure 4 is an end elevation of the apparatus of Figure 3.

The legends of Figure 1 explain the general nature and functions of the apparatus there shown. The pulsed X-ray beam from the X-ray pulse generator 15 is directed on the tinned strip 1, but is interrupted at intervals by the rotating reference plate 20. The reference plate is rotated by a synchronous motor 21 synchronized with the power supply of the X-ray pulse generator 15. The fluorescence generated alternately in the tin plate 1 and the reference plate 20 is converted by my X-ray detector 16 into pulses of electric current which after amplification are then separated by an electronic switch 32 into currents proportional to fluorescence from tin plate and reference plate respectively. The electronic switch 32 is triggered by impulses from solenoids 29 and 30 positioned adjacent the path of the rotating reference plate 20, which will be further described. The two currents from the X-ray detector operate a reversing motor 25 which moves the rotating reference plate 20 toward or away from the X-ray beam so as to balance the currents from the X-ray detector 16. The relative position of the rotating reference plate 20 with respect to the X-ray beam is electrically transmitted to a tin thickness recorder by a transducer or position pickup 24.

Figure 3:
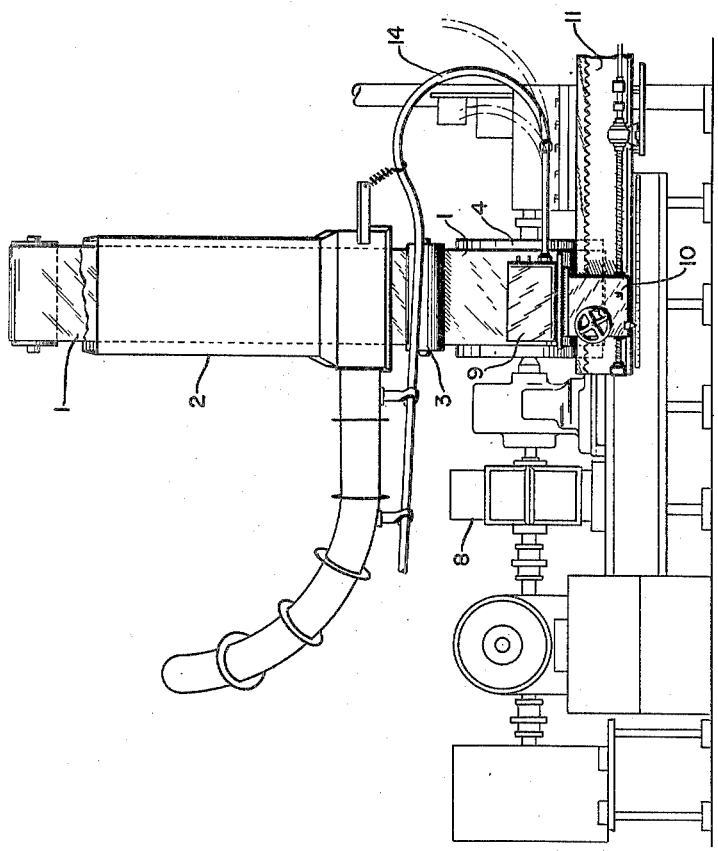
Figure 3 is an elevation of the arrangement of certain portions of my apparatus with respect to the strip coming from the continuous electrotinning line.

In Figures 3 and 4, the continuous tinned strip 1 coming from the final rinse tank of the electrotinning line passes through a hot air dryer 2 downwardly around snubbing roll 3, pulley roll 4, and between snubbing rolls 5 and 6 from which it is led to the coiler, not shown. Puller roll 4 is driven through reduction gearing 8 by drive means, which form no part of my invention and will not be described further. Shielded box 9 containing my X-ray tube and other apparatus shown in Figures 5 and 6 is supported by a carriage 10 which is movable transversely of the strip on ways 11. The electrical connections to the apparatus in my shielded box 9 and water connections for water cooling, if desired, are carried in flexible cable 14 which is supported above the apparatus and leads to a power source, not shown.

Within my shielded box 9 is located an X-ray tube 15 and an X-ray detector 16. The beam of X-rays from X-ray tube 15 is emitted through window 13 in the tube and directed through a window 17 in box 9 at the strip outside and the X-ray detector 16 is so positioned that fluorescence from the strip outside window 17 is directed back through window 17 and impinges on detector 16. Detector 16 is preferably of a type known as a scintillation counter and comprises a photomultiplier tube, such as Radio Corporation of America type 931–A, surrounded by a screen which is caused to fluoresce visibly by the impingement of X-rays thereon. Detector 16 is enclosed in a light tight casing 18 provided with a window 19 positioned to admit X-ray fluorescence to be detected. Rotating reference plate 20 is mounted on the shaft of synchronous motor 21 which in turn is mounted on ways 22 which permit it to move in a direction parallel to the X-ray tube 15. This motion of reference plate 20 is controlled by reversing motor 25 rotating screw 26 which engages nut 27 attached to the base of motor 21. Connecting means 23 connects motor 21 with a transducer 24 which converts changes in position of motor 21 into electrical currents which are used to actuate a conventional chart recorder. The transducer 24 may be a device conventionally used for this purpose, such as the G–24 transducer manufactured by Statham Laboratories. Two small solenoids 29 and 30 enclosing magnets are positioned 180° apart adjacent the path of the rotating reference plate 20.

The electrical circuit of my X-ray detecting means and balancing mechanism is shown in Figure 7. As the electrical circuit of my photomultiplier tube is conventional, this tube 16 is merely shown as a rectangle in the block schematic portion of Figure 7. The electrical output of this detecting means is amplified, preferably in a pre-amplifier located adjacent the photomultiplier tube and an amplifier which may be located at some distance from the photomultiplier tube. The pre-amplifier and amplifier are also of conventional design and are not shown in detail. The output of this amplifier, which consists of pulses of current corresponding to fluorescence from the specimen as well as pulses of current corresponding to fluorescence from the rotating reference plate, is conducted into an electronic switch designated generally as 32 which will be described in detail.

The current to the electronic switch 32 is introduced through a coupling capacitor 33 to the paralleled grids 35 and 36 of a twin triode vacuum tube 37. Bias is applied to the grids of this tube by battery 44 through resistor 39, which is bypassed by capacitor 38. The two cathodes 45 and 46 of twin triode 37 are connected to load resistors 40 and 41 respectively, the lower ends of which are connected to adjustable balancing resistor 42, the movable contact of which is connected through resistor 43 to ground. Cathode 45 is bypassed to ground by capacitor 49, and cathode 46 is bypassed to ground by capacitor 50. From cathode 45, shielded connector 51 leads through filter resistor 52 to motor control 53. From cathode 46, shielded connector 54 leads through filter resistor 55 also to motor control 53. Capacitor 58 is bridged between leads 51 and 54. Capacitor 59 bypasses lead 51 to ground and capacitor 60 bypasses 54 to ground. Plate 63 of twin triode 37 is connected through plate resistor 64 and resistor 65 to a source of direct voltage. Plate 66 of twin triode 37 is connected through plate resistor 67 and resistor 68 to the same source of direct voltage. A lead 70 from the junction of resistors 67 and 68 and a lead 71 from the junction of resistors 64 and 65 connect the plates 63 and 66 respectively of twin triode 37 to a trigger circuit formed by the two pairs of paralleled pentodes 74–75 and 76–77, respectively.

Cathodes 79, 80, 81, and 82 of these above-mentioned pentodes are all connected to ground as are suppressor grids 83, 84, 85, and 86. Plate 87 of tube 74 is connected through low resistance resistor 88 to plate 89 of tube 75. Likewise, plate 90 of tube 76 is connected through low resistance resistor 91 to plate 92 of tube 77. Screen 93 of tube 74 is connected through low resistance resistor 94 to screen 95 of tube 75. Screen 96 of tube 76 is connected through low resistance resistor 97 to screen 98 of tube 77. The screens 93 and 95 of tubes 74 and 75 are connected through resistor 100 to the plates 90 and 92 of tubes 76 and 77 and likewise the screens 96 of tube 76 and 98 of tube 77 are connected through resistor 101 to the plates 87 of tube 74 and 89 of tube 75. Plates 87 and 89 of tubes 74 and 75 are connected to lead 70 and plates 90 and 92 of tubes 76 and 77 are connected to lead 71. Control grid 104 of tube 74 is connected to control grid 105 of tube 75 as well as one terminal of solenoid 29. Control grid 106 of tube 76 is connected to control grid 107 of tube 77 and also to one terminal of solenoid 30. The other terminals of solenoids 29 and 30 are connected together and to ground. Connected across solenoid 29 is diode 110 and connected across solenoid 30 is diode 111. These diodes may be thermionic or may be of silica, germanium, or other semi-conductor.

Motor control 53 which is of conventional design supplies power to reversing motor 25 which operates as a balancing motor, as has been described.

The method of operation of my X-ray pulse generator and of my rotating reference plate has been described in connection with the description of these components of my apparatus. The operation of my photomultiplier tube used as a scintillation counter is conventional, as well as is the operation of my pre-amplifier and amplifier. The operation of my electronic switch 32 is novel, however, and will now be described. The cathode load resistors 40 and 41 of my twin triode 37, are of values equal to or greater than the plate resistance of this tube. The bias provided by battery 44 is adjusted to compensate in part for the voltage drop caused by the flow of plate currents through cathode resistors 40 and 41 so that each triode section of tube 37 tends to operate as the well-known infinite impedance detector. This tube, therefore, converts the pulsating current from the photomultiplier tube amplifier into direct currents which are applied through resistance-capacitance filters to motor control 53. In the absence of the trigger circuit composed of the two paralleled pentode pairs 74–75, and 76–77, the outputs of the two cathodes of tube 37 would be identical and would each consist of direct current corresponding to fluorescence from the specimen and fluorescence from reference plate. The purpose of the trigger circuit is to discriminate between currents corresponding to fluorescence from these two sources and to control the operation of tube 37 so that the output of one cathode consists of current corresponding to fluorescence from the specimen only and the output from the other cathode consists of current corresponding to fluorescence from the rotating reference plate only. The action of this trigger circuit is explained in detail in an article "Design and use of directly coupled pentode trigger pairs," by Victor H Regener, published in The Review of Scientific Instruments, for May, 1946. It is therefore unnecessary here to explain the theory of operation of this trigger circuit. As it is used in my apparatus, when a signal is applied to the control grids 104 and 105, for example, of tubes 74 and 75, these tubes draw plate current through resistor 68. The corresponding voltage drop through resistor 68 resulting therefrom considerably reduces the plate voltage on plate 66 of twin triode 37 and therefore cuts off plate current flow in this triode portion of the tube. Plate current continues to flow in tubes 74 and 75 until the application of a signal to control grids 106 and 107 of tubes 76 and 77 causes these tubes to conduct and tubes 74 and 75 to cut off. When this happens, the increased voltage drop through resistor 65 greatly reduces the voltage on plate 63 of twin triode 37 and causes the plate current of this section of the tube to cut off. At the same time the greatly reduced voltage drop through resistor 68 permits the application of full voltage to plate 66 and the flow of plate current in this triode portion of tube 37. The signals applied to the control grids of each pair of tubes in my trigger circuit are synchronized with the rotation of my rotating reference plate so that one triode section of twin triode 37 is operative only on current pulses corresponding to fluorescence from the specimen, and the other triode section is operative only on current pulses corresponding to fluorescence from the reference plate. Thus, the output currents from the twin triode sections of tube 37 correspond to specimen fluorescence and reference plate fluorescence respectively and these currents amplified if required by motor control 53 cause balancing motor 25 to rotate in one direction when the specimen current is stronger and in the other direction when the reference plate current is stronger.

The signal voltages operating my trigger circuit are supplied by solenoids 29 and 30. When the leading edge of my semi-circular reference plate 20 passes solenoid 29, which also contains a small permanent magnet, the reduction in reluctance of the magnetic field path caused by the presence of the ferrous base of the reference plate causes a change in the magnetic field surrounding this solenoid which generates a steep-fronted voltage pulse. This voltage pulse from solenoid 29 is applied to control grids of tubes 74 and 75 as is shown in the circuit of Figure 7. Similarly, when the leading edge of my rotating reference plate 20 approaches solenoid 30, a similar pulse is applied to the control grids of tubes 76 and 77. Diodes 110 and 111 are connected across solenoids 29 and 30, in such fashion that they do not conduct the current corresponding to the voltage pulse, above mentioned. These diodes do conduct, however, currents corresponding to the negative pulses generated in solenoids 29 and 30 when the trailing edge of my semi-circular plate 20 passes each solenoid respectively. The negative pulse from each solenoid is thus damped out and does not affect my trigger circuit.

My method and apparatus does not, of course, measure the tin thickness of the entire strip as it passes the X-ray tube. The region of the strip irradiated by my X-ray beam is a spot the shape and area of which are determined by the speed of travel of the tinned strip. At a strip speed of 720 ft. per minute, for example, this spot has an area of about 2½ square inches. As the electrotinned strip is continuously moving past my X-ray beam, however, my apparatus measures a line of such spots along the length of the strip, the distance between measured areas depending upon the speed of the electrotinning line. The irradiating and detecting apparatus in my shielded box 9 may be moved transversely across the strip on the ways 11 shown in Figures 3 and 4 so that measurements may be made at any region of the strip at will. It is, of course, possible to use two or more units of my apparatus on the electrotinning line so that measurements may be taken at several regions simultaneously.

It will be understood that the use of X-rays as herein described is accompanied with certain hazards, and it is therefore necessary to shield carefully my box 9, as has been mentioned. By locating this box adjacent the strip going over a heavy roll such as the puller roll 4, the escape of X-radiation is minimized, since such radiation which may pass through the tinned strip will be absorbed in the heavy steel roll.

Although I have described and illustrated a present preferred embodiment of my invention, it is not limited by this description but only by the appended claims.

I claim:

1. The improvement in the method of measuring the thickness of a metal coating on a metal base by the use of X-rays adapted to excite in the metal base fluorescence which is absorbed in the metal coating comprising irradiating alternately with a single X-ray beam the specimen and a standard sample of coated base, combining the alternate pulses of fluorescence from the specimen and standard, and measuring the relative intensities of the alternate pulses of fluorescence from the specimen and standard.

2. The improvement in the method of measuring the thickness of a metal coating on a metal base by the use of X-rays adapted to excite in the metal base fluorescence which is absorbed in the metal coating comprising irradiating with alternate pulses of a single X-ray beam the specimen and a standard sample of coated base combining the alternate pulses of fluorescence from the specimen and standard, and measuring the relative intensities of the alternate pulses of fluorescence from the specimen and standard.

3. The improvement in the method of measuring the thickness of a metal coating on a metal base by the use of X-rays adapted to excite in the metal base fluorescence which is absorbed in the metal coating comprising irradiating alternately with a single X-ray beam the specimen and a standard sample of coated base, combining the alternate pulses of fluorescence from specimen and standard into a single beam of X-ray fluorescence, converting this beam into an electric current, separating this current into separate electric currents corresponding to fluorescence from specimen and standard respectively, and measuring such currents.

4. The improvement in the method of measuring the thickness of a metal coating on a metal base by the use of X-rays adapted to excite in the metal base fluorescence which is absorbed in the metal coating comprising irradiating alternately with such an X-ray beam the specimen and a standard sample of coated base arranged and adapted to emit fluorescence corresponding in intensity to its relative position in the X-ray beam, measuring the intensity of the alternate pulses of fluorescence from the specimen and the standard, adjusting the position of the standard in the X-ray beam to balance the intensities of the fluorescence from the standard and specimen, and utilizing the relative position of the standard as an index of coating thickness.

5. The improvement in the method of measuring the thickness of a metal coating on a metal base by the use of X-rays adapted to excite in the metal base fluorescence which is absorbed in the metal coating comprising irradiating alternately with such an X-ray beam the specimen and a standard sample of coated base arranged and adapted to emit fluorescence corresponding in intensity to its relative position in the X-ray beam, converting the alternate pulses of fluorescence from specimen and standard into corresponding but separate electric currents, applying these currents to means controlling the position of the standard so that movement of the latter tends to balance these currents, and actuating indicating means by movement of the standard.

6. The improvement in the method of measuring the thickness of a metal coating on a metal base by the use of X-rays adapted to excite in the metal base fluorescence which is absorbed in the metal coating comprising directing a beam of such X-rays upon a specimen, alternately interposing between X-ray source and specimen and withdrawing therefrom a standard sample so that specimen and standard are alternately irradiated, and measuring the relative intensities of alternate pulses of fluorescence from the specimen and standard.

7. The improvement in the method of measuring the thickness of a metal coating on a metal base by the use of X-rays adapted to excite in the metal base fluorescence which is absorbed in the metal coating comprising directing a beam of such X-rays upon a specimen, alternately interposing between X-ray source and specimen and withdrawing therefrom a standard sample so that specimen and standard are alternately irradiated, combining the alternate pulses of fluorescence from specimen and standard into a single beam of X-ray fluorescence, converting this beam into an electric current, separating this current into separate electric currents corresponding to the fluorescence from specimen and standard respectively, triggering this separation by the alternating interposition and withdrawal of the standard, and measuring the separated currents.

8. Apparatus for measuring the thickness of a metal coating on a metal base comprising means for generating and irradiating a specimen with a beam of X-rays adapted to excite in the metal base fluorescence which is absorbed in the metal coating, means for detecting such fluorescence and converting it into electric current, a standard sample of coated base, means for alternately interposing this standard between X-ray generating means and specimen and withdrawing it therefrom so that the X-ray beam alternately irradiates specimen and standard respectively, switching means operating in synchronism with the standard interposing and withdrawing means so as to separate the electric current from the detecting means into two electric currents corresponding to fluorescence from specimen and standard respectively, and indicating means actuated by these electric currents.

9. Apparatus for measuring the thickness of a metal coating on a metal base comprising means for generating and irradiating a specimen with a pulsed beam of X-rays adapted to excite in the metal base fluorescence which is absorbed in the metal coating, means for detecting such fluorescence and converting it into electric current, a standard sample of coated base, means for alternately interposing this standard between X-ray generating means and specimen and withdrawing it therefrom so that alternate pulses of the X-ray beam irradiate specimen and standard respectively, switching means operating in synchronism with the standard interposing and withdrawing means so as to separate the electric current from the detecting means into two electric currents corresponding to fluorescence from specimen and standard respectively, and indicating means actuated by these electric currents.

10. Apparatus as in claim 8 in which the standard is in the form of a segment of a disk parallel to the specimen and the means for interposing and withdrawing it consists of means for rotating the disk segment about an axis through its center perpendicular to the specimen so that the X-ray beam alternately irradiates the specimen and standard respectively.

11. Apparatus for measuring the thickness of a metal coating on a metal base comprising means for generating and irradiating a specimen with a beam of X-rays adapted to excite in the metal base fluorescence which is absorbed in the metal coating, means for detecting such fluorescence and converting it into electric current, a standard sample of coated base arranged and adapted to emit fluorescence proportionate in intensity to its relative position with respect to the X-ray beam, means for interposing the standard between X-ray generating means and specimen and withdrawing it therefrom so that the X-ray beam alternately irradiates the specimen and standard respectively, means for adjusting the position of the standard sample with respect to the X-ray beam so that the area of the standard irradiated may be selected, switching means operating in synchronism with the standard interposing and withdrawing means adapted to separate the electric current from the detecting means into two electric currents corresponding to fluorescence from specimen and standard respectively, and indicating means actuated by these currents.

12. Apparatus as in claim 11 in which the standard is composed of an over layer of uniform thickness of coating metal and an under layer of base metal extending beyond the over layer so that adjustment of the position of the standard with respect to the X-ray beam adjusts the relative proportion of coating metal and base metal irradiated.

13. Apparatus as in claim 11 in which the means for adjusting the position of the standard sample is actuated by the two electric currents corresponding to fluorescence from specimen and standard respectively so that unbalance between these currents results in a change of position of the standard in the direction tending to balance these currents.

14. Apparatus as in claim 8 in which the standard is in the form of a segment of a disk parallel to the specimen, the means for interposing and withdrawing it consists of means for rotating the disk segment about an axis through its center perpendicular to the specimen so that the X-ray beam alternately irradiates specimen and standard respectively, the switching means consists of an electronic switch and the means for synchronizing the switching means with the rotation of the standard include a solenoid positioned adjacent the path of rotation of the standard and so adjusted that the passage of the leading edge of the standard generates in the solenoid a voltage pulse which is applied to the switching circuit of the electronic switch.

References Cited in the file of this patent

UNITED STATES PATENTS

| | | |
|---|---|---|
| 2,428,796 | Friedman | Oct. 14, 1947 |
| 2,503,062 | Moriarty | Apr. 4, 1950 |
| 2,512,355 | Marshall et al. | June 20, 1950 |
| 2,521,772 | Beeghly | Sept. 12, 1950 |
| 2,531,446 | Levy | Nov. 28, 1950 |
| 2,535,377 | Titterton | Dec. 26, 1950 |
| 2,635,192 | Cordovi | Apr. 14, 1953 |

OTHER REFERENCES

An X-ray Method for Determining Tin Coating Thickness on Steel, by H. F. Beeghly, from Journal of the Electrochemical Society, vol. 97, No. 4, April 1950.